(Model.)

W. C. HUDSON.
COTTON SEED PLANTER.

No. 263,521. Patented Aug. 29, 1882.

WITNESSES:
Chas. Nida
C. Sedgwick

INVENTOR:
W. C. Hudson
BY Munn & Co
ATTORNEYS.

UNITED STATES PATENT OFFICE.

WILLIAM C. HUDSON, OF YELLVILLE, ARKANSAS.

COTTON-SEED PLANTER.

SPECIFICATION forming part of Letters Patent No. 263,521, dated August 29, 1882.

Application filed December 5, 1881. (Model.)

*To all whom it may concern:*

Be it known that I, WILLIAM C. HUDSON, of Yellville, in the county of Marion and State of Arkansas, have invented certain useful Improvements in Cotton-Seed Planters, of which the following is a full, clear, and exact description.

Reference is to be had to the accompanying drawings, forming part of this specification, in which similar letters of reference indicate corresponding parts in all the figures.

Figure 1:
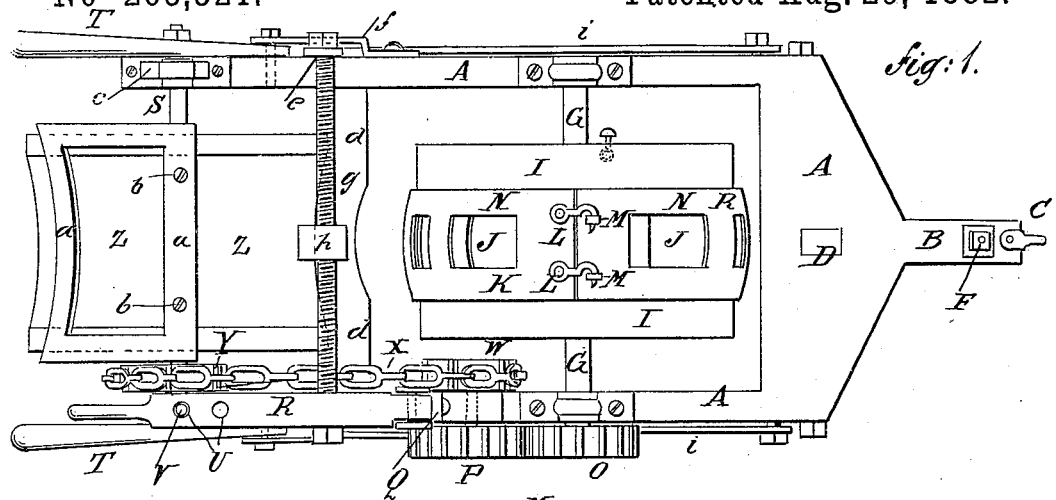
Figure 2:
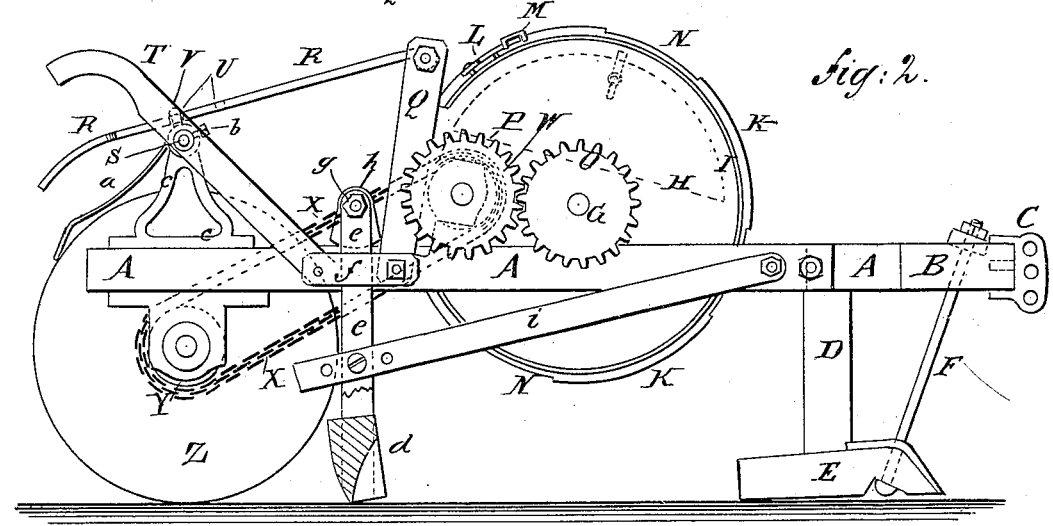
Figure 3:
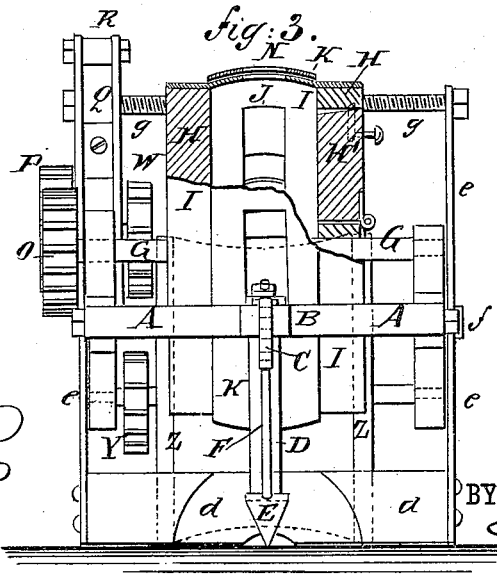

Figure 1 is a plan view of my improvement. Fig. 2 is a side elevation of the same, partly in section. Fig. 3 is a front elevation of the same, partly in section.

The object of this invention is to provide cotton-seed planters constructed in such a manner that they will plant the seed uniformly and in any desired quantity.

The invention consists in a novel construction and arrangement of parts, as hereinafter described, and pointed out in the claims.

A represents the frame of the machine, upon the forward end of which is formed, or to it is attached, a draw-bar, B, having a clevis, C, attached to its end. The clevis C is so constructed that the draft can be applied at a higher or lower point to regulate the depth at which the seed is deposited in the ground.

To the forward part of the frame A is attached the upper end of a standard, D, to the lower end of which is attached the middle part of the foot E. The foot E is made V-shaped in cross-section, and at its forward end is beveled upon the upper side. The beveled forward end of the foot E is faced with steel to prevent wear. The standard D is supported against the draft-strain by the brace F, the lower end of which is attached to the foot E, and its upper end is attached to the draw-bar B.

In bearings attached to the middle parts of the side bars of the frame A revolves a shaft, G, to which, upon the opposite sides of its center and equally distant therefrom, are attached two disks, H.

To the edges of the disks H are attached the edges of a band, I, of sheet metal, the part of which that is between the disks H being bulged or arched, as shown in Fig. 3. The disks H and band I form the seed-hopper, and the bulge of the band I causes the seed to press toward the middle part of the said band, so as to readily pass out through the discharge-openings J, formed through the middle part of the said band. A convenient arrangement for the openings J is to make them one inch wide and two inches long, and to leave a space of four inches between their adjacent edges.

Upon the bulged middle part of the band I is placed an open band, K, the ends of which are connected by hooks L, hinged to one of said ends and hooking into eyes M, attached to the other end, the said band being kept in place by friction. In the band K are formed openings N, corresponding in shape, number, and position with the openings J in the band I, so that the band K can be adjusted to leave the openings fully uncovered or to cover the said openings more or less, so as to discharge any desired amount of seed.

The seed is introduced into the hopper H I through an opening in one of the disks H, which opening is closed by a door, H'. The door H' is held shut when the planter is at work by a spring-catch or other suitable fastening.

To one end of the shaft G is attached a gear-wheel, O, into the teeth of which mesh the teeth of the gear-wheel P, journaled to bearings attached to the lever Q. The lower end of the lever Q is hinged to a side bar of the frame A, and to its upper end is attached the end of a bar, R. The bar R rests upon the round S of the handles T, the lower ends of which are attached to the side bars of the frame A. In the bar R are formed two holes, U, to receive a pin, V, attached to the round S, so that the gear-wheels O P can be thrown into and out of gear by adjusting the bar R.

To the inner end of the journal of the gear-wheel P is attached a chain-wheel, W, around which passes an endless chain, X. The chain X also passes around a chain-wheel, Y, attached to a journal of a roller, Z, which is journaled in bearings attached to the lower side of the rear ends of the side bars of the frame A. The roller Z is designed to press the soil down upon the seed, and has its face concaved, as shown in Fig. 1, so as to leave the top of the row in proper form. Any soil that may adhere to the face of the roller Z is removed by the scraper-plate *a*, the lower part of which is so formed as to fit upon the concaved face of the said roller Z.

The middle part of the scraper-plate $a$ is cut away, so that the soil loosened from the face of the roller will be carried forward by the said roller and dropped to the ground. The upper part of the scraper-plate $a$ is attached to the round S of the handles T by set-screws $b$, so that the said scraper-plate can be adjusted to work at any desired closeness to the face of the roller Z. The handles T are supported by brackets $c$, attached to the side bars of the frame A, and to which the handle-round S is attached. With this construction the roller Z is revolved by contact with the ground, and the seed-hopper H I is revolved from the said roller by the chain-gearing Y X W and the gear-wheels P O, so as to deposit the seed in the channel opened by the foot E.

The seed is covered by the covering-block $d$, the lower part of which is concaved, as shown in Figs. 1, 2, and 3, so as to draw in the loose soil forced aside by the foot E and cover the seed. The covering-block $d$ is attached to the lower ends of upright bars $e$, which slide up and down in keepers $f$, attached to the side bars of the frame A. The upper ends of the upright bars $e$ are connected by a rod, $g$, from which can be suspended weights $h$, of any required gravity, to hold the covering-block $d$ down to its work with such a pressure as the character of the soil may require. The draft-strain upon the covering-block $d$ is sustained by the bars $i$, the rear ends of which are attached to the uprights $e$, and their forward ends are attached to the forward parts of the side bars of the frame A.

If desired, the covering-block $d$ can be detached, and shovel-plows can be connected with the upright bars $e$ by U shaped coupling-bars connected with the said upright bars by bolts and break-pins. In this case the bars $e$ should be secured to the side bars of the frame A, and the weight $h$ need not be used.

The seed-hopper H I is arranged about four inches above the surface of the ground, so that the discharge-openings cannot become clogged with soil.

The machine can be adjusted for planting corn by replacing the band K with a band having two discharge-openings directly opposite each other. The discharge-openings should be about an inch long and half an inch wide, and the band should be so adjusted as to leave the discharge-openings of such a size as will drop the desired number of kernels at a time. In this case the gearing should be so arranged as to revolve the seed-hopper at such a speed that the hills will be dropped at the desired distance apart.

Having thus fully described my invention, I claim as new and desire to secure by Letters Patent—

1. In a seed-planter, the combination, with the frame A, the shaft G, the gear-wheel O, the chain-wheel or roller Z, and the chain X, of the gear-wheel P, the hinged lever Q, the chain-wheel W, and the rod R, substantially as and for the purpose set forth.

2. In a seed-planter, the combination, with the frame A, the shaft G, carrying the seed-hopper H I K and the gear-wheel O, and the roller Z, carrying the chain-wheel Y, of the gear-wheel P, the hinged lever Q, the chain-wheel W, the chain X, and the perforated rod R for securing the same to the handles, substantially as and for the purpose set forth.

3. In a seed-planter, the combination, with the side bars of the frame A provided with the keepers $f$, of the concave covering-block $d$, the vertically-sliding uprights $e$, the connecting-rod $g$, the weight $h$, and the draw-bars $i$, substantially as and for the purpose set forth.

WILLIAM C. HUDSON.

Witnesses:
C. E. FRANTZ,
WESLY PARKER.